United States Patent Office 3,395,808
Patented Aug. 6, 1968

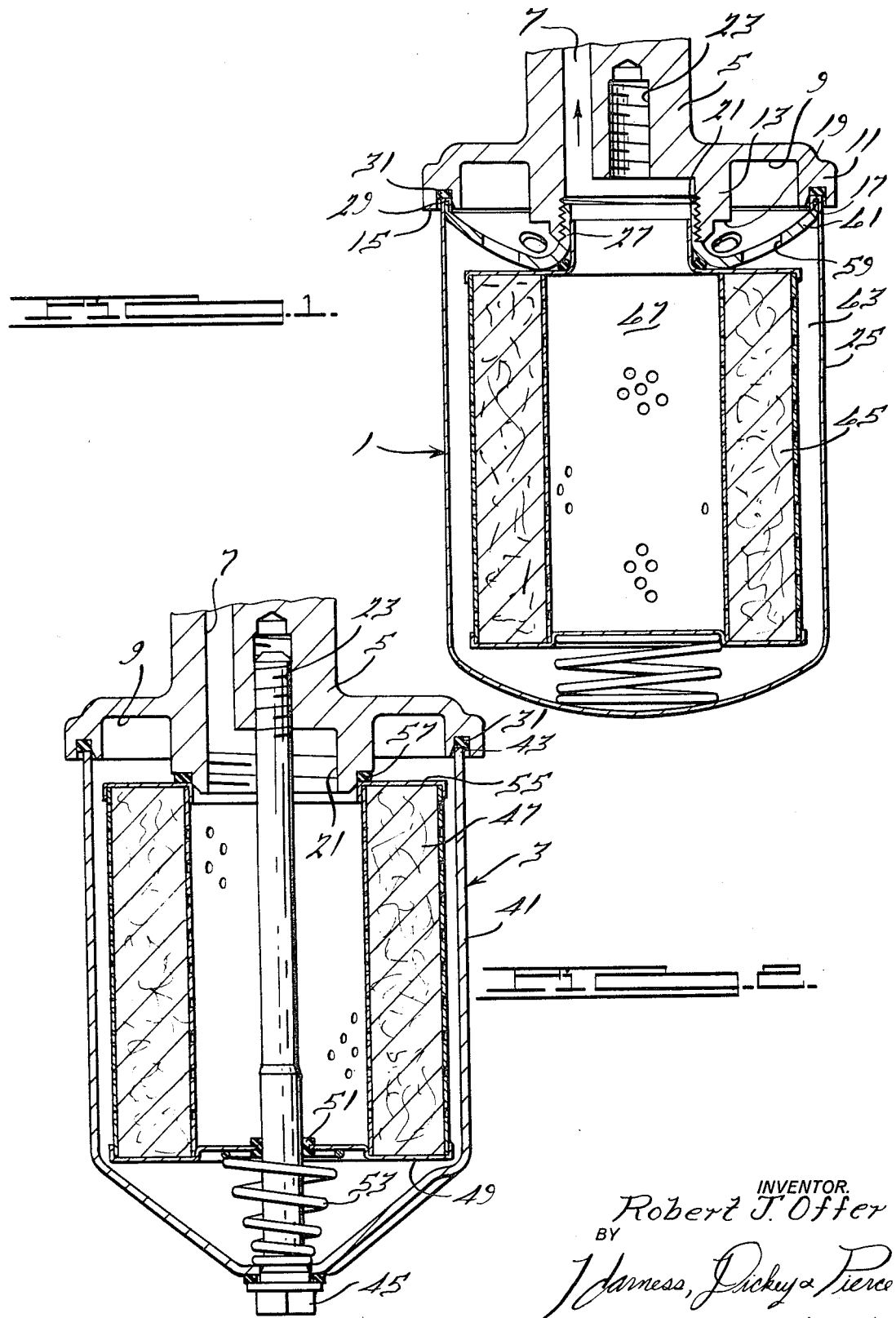

3,395,808
BASE FOR DIFFERENT FILTERS
Robert J. Offer, Racine, Wis., assignor to Walker Manufacturing Company, Racine, Wis., a corporation of Delaware
Filed Aug. 4, 1966, Ser. No. 570,332
1 Claim. (Cl. 210—444)

ABSTRACT OF THE DISCLOSURE

Liquid filter devices wherein a base for receiving such devices has plural threaded portions and cooperating sealing means to enable the use of multiple types of filtering units thereon.

My invention relates to liquid filter devices and in particular to filter devices which include a base that removably receives and is sealed to a filter unit containing a filter material.

In internal combustion engines that are used in automobiles and trucks, two different types of oil filters are in common usage. One of these is the replaceable element type comprising a housing or shell containing a filter element that can be removed from the shell and replaced with a fresh filter element. The other is the throwaway or disposable filter type in which the filter element is permanently contained within the shell so that the filter unit as a whole is replaced when the filter element becomes clogged with contaminants that have been removed from the oil. Each type of unit must, of course, be removably attached to the filter base and when attached must be sealed to the filter base so that there is no leakage of oil. It is the purpose of the present invention to provide a filter base construction which can accept either of these two types of filters and effectively hold and seal them in place.

The invention is illustrated in the accompanying drawings, in which:

FIGURE 1 is a cross section through an assembly of filter base and throw-away type filter, and FIGURE 2 is a corresponding section through the filter base of this invention showing how it receives a filter of the type containing a replaceable filter element.

The filter base of FIGURES 1 and 2 is identical and the difference in the two filters resides in the fact that FIGURE 1 shows a throw-away type filter 1 whereas FIGURE 2 shows a replaceable element type filter unit 3.

The filter base construction comprises a body 5 which may actually be a part of an internal combustion engine. It has a passage 7 formed in it which directs oil that has been filtered back to the bearings or other desired point within the engine. The body 5 also has an annular shaped recess 9 formed in it which receives oil (through a passage not shown in the drawings) that is ready to be filtered so that the recess 9 forms a part of an inlet chamber for the filter 1 of 3. On opposite sides of the recess 9 and forming the inner and outer walls for it, are the annular outer boss 11 and the annular inner boss 13. The outer boss 11 has a flat radial surface 15 and, if desired, this may be provided with an annular groove 17. The inner boss 13 has a radial flat surface 19 and its inner diameter is threaded as seen at 21. The body 5 is also provided with a threaded hole 23.

In use with the throw-away filter 1, the surface 15 provides a means for sealing the housing 25 of the filter to the body of the filter body 5, and the threaded portion 21 of the boss 13 provides a means to receive an externally threaded neck 27 on the throw-away filter 1. When the filter 1 is rotated so that the neck 27 screws into a threaded portion 21, the end edge 29 of the filter 1 will be forced against the seal 31 which is seated in the bottom of the recess 17.

Referring to FIGURE 2, the filter 3 comprises a housing 41 which is open at its top end so that the bottom edge of the shell engages the rubber seal 31 in groove 17. The bottom edge 43 is held tightly against the seal 31 by means of the holddown bolt 45 which extends through the housing 41 and threads into the threaded aperture 23 in the filter base 5. Inside of the shell 41 is a filter element 47 which has a bottom end cap 49 which is sealed by means of gasket 51 to the bolt 45 which passes through it. A spring 53 engages the cap 49 and the inside of the shell 41 and presses the top end cap 55 of the filter element 47 against a rubber sealing ring 57 that is fitted on the radial surface 19 of the body 5. The cap 55 is held tightly against the ring 57 by the holddown bolt 45 as it threads into the hole 23.

It is apparent that when the bolt 45 is loosened to the point that it is removed from the hole 23, the housing 41 can be removed and the filter element 47 taken out of the housing and replaced with a new filter element. After this the entire assembly can be secured and sealed back in place by tightening the screw 45 in the hole 23.

In the assembly of FIGURE 2 oil passes from the inlet chamber 9 into the annular space between the shell 41 and the filter element 47, radially through the filter element, into the center tube, and up and out through passage 7. The seal 57 prevents bypassing directly from the inlet chamber 9 into the outlet passage 7 and the seal 31 prevents escape from the filter.

In the assembly of FIGURE 1, oil from the oil inlet chamber 9 in the filter base flows through openings 59 in the base plate 61 of the filter 1, to flow into the space 63, radially through the filter element 65, into the center tube 67, from where it flows into the outlet passage 7. In this installation seal 31 prevents escape of oil from the filter.

It will be realized that the filter base of this invention has a central threaded portion, that may be either the aperture 23 or the neck 21, which receives the attaching force of the replaceable element type filter 3 or the throwaway filter 1. It also has an outer sealing surface 15 or 17 which receives the sealing edge 29 of the filter 1 or 43 of the filter 3. In addition, it has a surface 19, which is adapted to form a sealing surface with the replaceable element 47 of the filter 3.

Modifications may be made in the specific structure illustrated without departing from the spirit and scope of the invention.

I claim:
1. A filter base constructed to receive selectively either a throw-away type filter or a replaceable element type filter, both said filters having an outer sealing edge and a centrally located threaded means for attaching the cartridge to the base, said base comprising a body having a centrally located threaded means adapted to receive a threaded means on said filters, said base having an outer boss providing an annular outwardly located sealing surface adapted to engage the outer sealing edge of both said filters, said base having an inner boss providing an inner annular sealing surface adapted for sealing engagement with the replaceable element of one of said filters, the space between said outer boss and said inner boss comprising an inlet chamber for oil to be filtered by both said filters, and said body having a space in communication with said centrally located threaded means comprising an outlet passage for oil that has been filtered by a filter, said centrally located threaded means in said base comprising a threaded portion on said boss and an internally threaded hole in said base coaxial with said threaded portion.

References Cited

UNITED STATES PATENTS

| | | | |
|---|---|---|---|
| 2,330,945 | 10/1945 | Becker | 210—444 X |
| 2,514,366 | 7/1950 | Beyland | 210—442 |
| 3,000,506 | 9/1961 | Hultgren. | |
| 3,021,955 | 2/1962 | Joyce | 210—132 |
| 3,259,247 | 7/1966 | Tietz | 210—239 X |

REUBEN FRIEDMAN, *Primary Examiner.*

F. MEDLEY, *Assistant Examiner.*